Patented Oct. 10, 1944

2,359,789

UNITED STATES PATENT OFFICE 2,359,789

GLASS COMPOSITION AND METHOD OF MAKING SAME

Alexis G. Pincus, Southbridge, Mass., assignor to American Optical Company, Southbridge, Mass., a voluntary association of Massachusetts No Drawing. Application September 15, 1941, Serial No. 410,879

17 Claims. (Cl. 106—52)

This invention relates to a new glass composition and method of producing same, and relates more particularly to lenses of said glass composition, other devices requiring the properties of said glass composition and to modifications of said glass composition and articles resulting therefrom.

One of the principal objects of the invention is to provide a glass composition which is stabilized against chemical attack, which can be worked and annealed with the conventional glass making and working equipment, and to which additional ingredients may be added for producing controlled color and infra-red and ultra-violet absorption and method of making the same.

Another important object is the provision of a normally slightly tinted heat absorbing glass which when used in a projector and is subjected to the heat inherent in the light rays of said projector, will bleach out and transmit said light rays substantially unaltered as to color and method of making the same.

A further object is to provide an improved glass composition and an improved method of making same, which composition is highly resistant to breakage due to abrupt temperature changes in a portion or the whole of the composition.

A further object is to provide an improved glass composition and method of making same, which composition has extremely high strain and softening temperatures.

A further object is to provide a glass used for optical purposes, said glass resulting from a composition derived primarily from a batch using aluminum metaphosphate or its substantial equivalent as its main ingredient.

A further object is to provide a batch yielding a glass composition having aluminum metaphosphate or its substantial equivalent as its principal constituent, wherein the batch is easily melted to a homogeneous liquid with a minimum of fuming and frothing, and minimum loss by volatilization of constituents desired in the resultant glass, and which resultant melt can be worked and annealed with conventional standard glass making equipment.

Another object is to provide an improved light polarizing unit embodying a layer of infra-red absorbing glass having low ultra-violet transmission and high visual transmission.

Another object is to provide glasses having high strain and softening temperatures that may be tempered by intentional hardening or tempering treatments and which will not acquire further strain in use nor lose said intentional tempered or hardened characteristics when subjected to high temperatures.

Other objects and advantages will become apparent from the following description, and it will be apparent that many changes may be made in the process and article or articles resulting therefrom without departing from the spirit of the invention as expressed in the accompanying claims. The exact details are merely preferred forms given only by way of illustration and are not to be considered as limitations.

Heretofore, glass batches have been made using phosphorus pentoxide ($P_2O_5$), alumina ($Al_2O_3$), and silicon oxide ($SiO_2$), as part of the ingredients as shown by chemical analysis. However, other ingredients were present in the ultimate glasses, which glasses had certain undesirable characteristics which have been overcome as indicated in the teachings of the present disclosure. Certain of the ingredients said to be essential in the teachings of certain of the prior art were lead and/or antimony oxide. According to the disclosure in the present application, the use of lead and/or antimony oxide as taught in the prior art is not only unnecessary but undesirable.

Even if the teachings of certain of the prior art is carefully followed and melting is carried out under suitable oxidizing conditions, as referred to by the prior art, the glass when originally completed may be transparent, but transparency of the glass has been found to disappear in part or almost wholly when the glass is reheated for molding and reworking. This has been found to be due to the use of lead and antimony oxides.

Since the oxidation method of the prior art, using lead and antimony, did not produce a suitable glass, the method of reduction, as taught by the present application, for producing a high efficiency infra-red absorbing glass, was tried and resulted, during the original melting, in a black form which rendered the glass opaque. Refabrication is important since commercial glass frequently is marketed having a thickness greater than that desirable for reworking the material into specific articles such as heat screens, lenses, and other glass articles. The present invention is free of the above undesirable limitations which have been found to be prevalent in the glasses containing lead and antimony oxides. The glass as manufactured according to the teachings of this application will permit a reheating of the glass so that it may be rolled, drawn, blown, or otherwise manipulated to result in a glass of a suitable thickness and shape for use in specific applications.

Glass compositions of this general type, where the presence of lead and/or antimony was considered essential, were invariably imported glasses which are not now obtainable. These imported glasses have been sold, heretofore, with the understanding that they were not stable and the surfaces thereon required a special treatment to increase their resistance to weathering. Further, glasses of this type were dispensed by the foreign manufacturers with reservations indicating that because of the peculiar properties of the glass and the special treatment required of the surfaces, repressing, regrinding, and repolishing were indicated as being inadvisable because the characteristics of the glass and the surface treatment thereof were such as to not withstand reworking. Actual experience has taught that these undesirable characteristics were prevalent in the particular prior art glass in question. The present application definitely eliminates these peculiar undesirable characteristics as the glass resulting from the teachings thereof is stable, and may be worked as any other glass, in that repressing, regrinding, and repolishing does not affect the glass, and no special surface treatment is required.

According to the teachings of this invention a glass desirable for the uses disclosed herein is obtainable by using the following glass formula as a base:

EXAMPLE 1

| Ingredient | Range of parts by weight |
|---|---|
| $P_2O_5$ | 45 to 80. |
| $Al_2O_3$ | 8 to 25. |
| $SiO_2$ | 1 to 30. |

Glass having the above chemical analysis within the given ranges has outstanding characteristics with respect to all the practical criteria, the chemical durability is good, and the glass has a low coefficient of expansion and desirable heat shock resistance, high strain and softening, temperature with an unusually high scratch resistance. Glass manufactured from the above indicated formula can be reworked satisfactorily without crystallizing or turning opaque, and the surfaces may be ground and polished by conventional methods without resulting in loss of chemical durability.

A specific formula which produces a very desirable base glass is as follows:

| Ingredient | Parts by weight |
|---|---|
| $P_2O_5$ | 68 |
| $Al_2O_3$ | 16 |
| $SiO_2$ | 16 |

Actual tests reveal that base glass made according to the above specific formula has an index of refraction of about 1.526, a reciprocal relative dispersion of about 85 as measured on an Abbe refractometer and has a thermal expansion coefficient, alpha=$3.9 \times 10^{-6}$. The strain temperature and softening temperature as determined from the thermal expansion curve are respectively 750° C. and 880° C. The resultant glass is homogeneous, clear and substantially free from color. The visual transmission approximates the theoretical value of 92 percent. Water solubility by a standard powder method is 0.8%, which compares with 4 to 6% for a good quality of ophthalmic crown glass.

Using the above formula as a base a desirable glass composition may be obtained by adding ferrous oxide (FeO), from a suitable source to produce a heat absorbing glass with a low coefficient of expansion. One article resulting from this type of glass is usually referred to as a heat screen, such as is used in projection machines for absorbing the heat of the infra-red rays produced by the light source, so that the heat from the infra-red rays does not attack the film and cause combustion or heat injury thereof. To produce a desirable heat absorbing glass, the following formula is used:

EXAMPLE 2

*Specific example*

| Ingredient | Parts or percent by weight | Range of parts by weight |
|---|---|---|
| $P_2O_5$ | 63 | 45 to 80 |
| $Al_2O_3$ | 15 | 8 to 25 |
| $SiO_2$ | 20 | 5 to 30 |
| FeO | 2 | 0.5 to 6 |
| | 100 | |

In the base batch the $P_2O_5$ is the primary glass forming material. The $Al_2O_3$ is used as a stabilizer to decrease water solubility and weathering. The $SiO_2$ assists in melting and working. The FeO may be produced from a desirable source and when properly treated during the melting of the glass results in an infra-red absorbing glass, with very low absorption of visible radiation. The above glass has a slight tint at room temperature but has a very desirable characteristic in that this slight tint fades out as the glass becomes heated as results in actual use in a projector and has substantially no color altering effect on the light transmitted thereby.

The glass resulting from the composition presented in Example 2 will have satisfactory infra-red absorbing qualities when substantially all of the iron is reduced to the ferrous state as given in said Example 2. This glass is an excellent ultra-violet transmitter.

EXAMPLE 2B

*Specific example*

| Ingredient | Parts or percent by weight | Range of parts by weight |
|---|---|---|
| $P_2O_5$ | 63 | 45 to 80 |
| $Al_2O_3$ | 15 | 8 to 25 |
| $SiO_2$ | 20 | 5 to 30 |
| FeO plus $Fe_2O_3$ | 2 | 0.5 to 10 |
| | 100 | |

In Example 2B, it is desired to make a substantially similar glass composition to the glass composition given in Example 2 but having the properties of ultra-violet absorption as well as infra-red absorption, the melting conditions are modified slightly so that the reduction of the iron is not too complete. A certain proportion of the iron should remain in the ferric form, which ferric form of iron leaves the glass with high ultra-violet absorption qualities. However, the oxidation-reduction relationship must be such that the control in manufacturing the glass does not permit sufficient ferric iron to form so that the absorption extends into the visible spectrum, wherein relatively dark brown colors are formed in the ultimate glass.

Balancing of the ratio between ferrous and ferric iron within the glass composition resulting from Example 2B brings about a glass which is nearly colorless but may have a very slight greenish tint. The extent of the oxidation to the ferric iron will vary the tint so that the glass composition gets slightly brownish, and the more completely the ferrous becomes ferric, the darker becomes the shade of brown. It is to be particularly pointed out that while the glass manufactured according to Example 2B has excellent infra-red and ultra-violet absorption, its color is much less than that of prior art glasses which achieve both of these objects of absorbing infra-red and ultra-violet. Example 2B adds to the base batch of Example 1, a certain amount of iron oxides which when properly controlled gives the base batch glass intra-red and ultra-violet absorbing qualities.

It may be desirable when using such glass for ophthalmic lenses to change the tint of the glass when a cosmetically pleasing tint is preferred, which tint will be soothing to the eyes and be of a color that will more nearly blend with the background of the facial color so as to reduce conspicuousness of the glass when worn by the individual. A slight change in the formula as presented in Example 2B may be obtained by the addition of alkali oxides such as lithium, sodium, and potassium oxides. The addition of the alkali will vary the formula so that it is now substantially as shown in Example 3:

EXAMPLE 3

Specific example

| Ingredient | Parts or percent by weight | Range of parts by weight |
| --- | --- | --- |
| $P_2O_5$ | 63 | 45 to 80. |
| $Al_2O_3$ | 15 | 8 to 25. |
| $SiO_2$ | 18 | 1 to 25. |
| FeO plus $Fe_2O_3$ | 2 | 0.5 to 10. |
| $Na_2O$ | 2 | 0.1 to 10. |
|  | 100 |  |

In both Examples 2B and 3 the representation of iron content is FeO plus $Fe_2O_3$, that is, a favorable balance between them is obtained to produce the desirable infra-red and ultra-violet absorption and color.

Examples 1, 2, 2B, and 3 which have been presented thus far in the application have expressed the chemical analysis of the ultimate glass. However, in manufacturing the glass, a wide variety of materials is possible to produce any or all of the glasses as indicated in the foregoing examples.

For instance, the materials for the batch resulting in the glass indicated in Example 1 may introduce the major ingredient of $P_2O_5$ in the form of the oxide itself, or in the form of one of the phosphoric acids.

In the prior art, the descriptions of the manufacture of phosphate glasses invariably taught mixing other ingredients with liquid phosphoric acid in the batch, then heating at a low temperature to drive off the water inherently present and finally heating to the proper glass melting temperature. Vaporization consumes heat and produces disagreeable results in that the batches are likely to froth over the edges of the container, to spatter, and to evolve dense white fumes which represent a loss of the valuable constituent, namely $P_2O_5$. This volatilized phosphoric acid also attacks the furnace structure and upon reaching the atmosphere causes a severe corrosion and creates a health problem.

Ammonium phosphates have also been used in the past as a source of $P_2O_5$ in glass melts but have similar disadvantages in that they make batches bulky and produce strong fuming. In addition they may create a stronger reducing action in melting than is desired and act to restrict the ferrous-ferric control which the present application points out as being desirable for obtaining some of the particular objects set forth herein.

The above factors have hitherto retarded large scale exploitation of phosphate glasses.

A glass composition may be obtained having a chemical analysis as disclosed in Examples 1, 2, 2B, and 3, and the resulting glass having the properties of the glass containing the composition as set out in said examples may be manufactured in any convenient manner commonly known in the art. However, the use of aluminum metaphosphate $[Al_2O_3 \cdot 3(P_2O_5)]$, as a primary ingredient has been found highly satisfactory for producing glass having the chemical analysis indicated in Examples 1, 2, 2B, and 3. It has been found that aluminum metaphosphate itself can be melted to form a glass with desirable properties. The glass formed using aluminum metaphosphate as the only ingredient in the batch is usually very difficult to melt, and to retain in glassy condition, down to room temperature.

It has further been found that extraordinarily small additions of less acidic oxides greatly improve the melting and working characteristics of the aluminum metaphosphate. As one example, if there is added one-tenth of 1% by weight of an alkali salt such as sodium carbonate ($Na_2CO_3$) or sodium fluoride (NaF) yielding about 0.05% $Na_2O$ in the final glass, the melting point of the aluminum metaphosphate is lowered from above 2800° F., to below 2650° F. Instead of crystallizing immediately during cooling, the melt will stay in the glassy condition.

A major advantage of using the aluminum metaphosphate as the primary ingredient over the techniques described in the prior art is the fact that it does not introduce water into the batch. Therefore, it is not necessary to consume heat boiling off the water. Secondly, the high volatility of $P_2O_5$ in the presence of water is avoided. By eliminating the boiling off described herein, a definite health and corrosion problem is eliminated.

Aluminum metaphosphate is specifically mentioned as a major ingredient, but it is to be understood that through the use of suitable raw materials a substantial equivalent of metaphosphate may be found by combinations of substances yielding phosphorus pentoxide ($P_2O_5$) and aluminum oxide ($Al_2O_3$) in a glass melt.

It has also been found that iron or its salts and oxides react with aluminum metaphosphate to give a glass of low thermal expansion. The addition of silica as described in previous examples greatly improves the melting and working characteristics of these aluminum metaphosphate glasses containing iron without appreciably increasing their thermal expansion or lowering their softening and strain temperatures.

A smaller or larger proportion of silica than that given in the specific examples can be used without impairing the desirable characteristics of this glass. Since silica is the least expensive ingredient, however, it is usually desirable to keep the silica content at a maximum.

Instead of deriving all of the Al₂O₃ from aluminum metaphosphate some of the Al₂O₃ may be derived from calcined alumina or from aluminum silicates such as in kaolin, kyanite, or pyrophyllite etc.

Beryl or beryllium oxide (BeO) can be substituted molecularly for alumina ($Al_2O_3$) or mixtures of $Al_2O_3$ and BeO can be used in lieu of the alumina wherever $Al_2O_3$ has been mentioned throughout the specification.

In addition minor percentages of other bivalent oxides, such as magnesium, calcium, barium, or zinc, can be introduced as means of altering and controlling the physical properties especially fluidity of the melt, working range, and absorption and color characteristics.

A technique which has been found useful for preparing homogeneous glass even at the highest silica contents is to make a quick preliminary melt and pour into cold water, the mass including any unreacted silica. After draining off the water and drying, the mass is pulverized and then re-melted. The silica and glass are now in such intimate contact that rapid solution takes place and nicely homogeneous glass is obtained at several hundred degrees less than would be otherwise necessary.

While this last method may seem uneconomic because of the double melting, actually it shortens the total melting time and this latter method affords a convenient way of adjusting the proportions of phosphate, silica, and alumina in natural ores and reducing their water content before shipment to the glass factory.

Still another advantage is the superior control of the color which this double melting process makes possible. Since lower temperatures are used than when complete homogenization is attempted all at once and since iron and its compound dissolve in these aluminum silico-phosphate melts at relatively low temperatures, the iron can be withheld until the second melt. At these lower temperatures a much sharper absorption band in the infra-red is obtained, and the glass has a higher visual transmission and a lighter, more pleasing tint.

An ideal heat screen would absorb all infrared radiation and let through all visible light. Since about 4% of the radiation is lost by reflection at each surface for a glass having a 1.5 refractive index, the maximum visual transmission is 92%. The efficiency of a heat screen can be evaluated by substituting the measured values of visual and infra-red transmissions into a formula for computing percent heat screen efficiency, where E equals the percent heat screen efficiency:

$$E = 100 \left( \frac{\text{Percent visual transmission}}{92} - \frac{\text{Percent infra-red transmission}}{\text{Percent visual transmission}} \right)$$

For example, for the ideal heat screen:

$$E = 100 \left( \frac{92}{92} - \frac{0}{92} \right) = 100\%$$

For a heat screen specimen resulting from a glass in accordance with Example 2 having a visual transmission of 85 percent and an infra-red transmission of 11 percent:

$$E = 100 \left( \frac{85}{92} - \frac{11}{85} \right) = 79\%$$

The heat screen efficiency formula is useful for comparing efficiency of different heat screens, and also for determining the optimum percentage of iron to add to the colorless base batch for the most practical heat screen efficiency.

Referring again to the production of infra-red and ultra-violet absorbing glass with a controlled color, it has been found that upon the addition of alkali oxides to a composition, the optical properties of the glass become greatly affected by the temperature used for melting. For example, the following Table A shows the result of a few of the temperatures used for one particular composition or some of the resultant characteristics of light transmission of the glass resulting from said composition.

TABLE A

| Melting temperature in °F. | Millimicrons where ultra-violet transmission equals 5% | Percent total energy transmission | Percent visual transmission |
|---|---|---|---|
| 2,000 | 374 | 58 | 73 |
| 2,200 | 377 | 42 | 65 |
| 2,400 | 371 | 25 | 57 |
| 2,500 | 370 | 20 | 50 |

The glasses described in Table A have about 4% FeO, and all have pleasing warm flesh tints.

The same base glass with only 2% FeO melted at 2500° F. gave corresponding figures of 363—45—80, and a lighter flesh tint.

A similar glass with only 1% FeO melted at 2600° F., gave figures 355—55—87 and appears almost colorless.

These data show that by suitable variation of iron content, composition and melting temperature, a wide range of absorptive properties can be obtained.

Further modification of the color can be obtained by adding minute quantities of other coloring agents besides iron. The coloring of prior art glasses with such agents is well known, but with the type of base batch glass presented herein it has been found that these agents produce certain totally unexpected results.

Certain of the unexpected results obtainable by using known coloring agents, besides iron, in the base batch presented herein is an intense coloration obtained with relatively small percentages of the coloring agents referred to herein. Further, the glass colors are more pure, and in many instances are particularly advantageous for use as spectral filters since they exhibit sharper absorption bands than is ordinarily expected when using this type of coloring agent.

A further example of the contrast in unexpected color when adding the agents to the base batch presented herein, may be brought out by indicating that the prior art discloses a silica-free phosphate glass which is colored violet by using titanium under reducing conditions. Using the base batch as presented in Example 1 with titanium as a coloring agent in an amount of about one-tenth of that set forth in the said prior art, the resulting glass has a dark blue tint.

Similarly unexpected and useful results have been obtained with other colorants. For example, the following table is presented to indicate that for the very small amount of colorant, the glass has the unusual color as indicated in said table.

TABLE B

| Coloring oxide | Parts by weight | Color |
|---|---|---|
| Cobalt | 0.01 | Dark blue. |
| Nickel | 0.2 | Dark brown. |
| Do | 0.01 | Amber yellow. |
| Vanadium | 0.1 | Bright yellow. |
| Tungsten | 0.1 | Delicate blue. |

It has been found that glass resulting from the batch 2B disclosed herein and containing infra-red absorbing ingredients is highly suitable for producing light polarizing assemblies, such assemblies being formed by superposing a layer of the above mentioned glass with a film of light polarizing material and joining said layer with said film by a suitable adherent. The polarizing film mentioned herein is preferably in the form of a suitable supporting material having oriented therein a plurality of minute light polarizing crystals.

To the above assembly, if desired, a layer of any clear glass may be secured to the film on the side thereof opposite the first mentioned glass layer or the said film may be sandwiched between two layers of the glass embodying the invention. The novel result obtained is that of producing an ultra-violet and infra-red absorbing, light polarizing unit which has a high visible light transmission. The infra-red control is that derived from the infra-red absorbing glass embodying the invention, the ultra-violet control is partially that inherent in the material used in forming the polarizing film, the light polarizing characteristics is that resulting from the polarizing means of the film, and the high visual transmission is that resulting from the high visual transmission of the glass.

The glass in this particular instance is that of formula 2B which has low ultra-violet transmission and it is particularly desirable in an assembly of this nature since, in many instances, the adherent or the media in which the polarizing crystals are suspended is susceptible to injury resulting from ultra-violet light and will thereby be protected by the low ultra-violet transmission of the glass. In this particular assembly, care is taken that the glass embodying the invention and which has low ultra-violet transmission, as set forth above, is placed on the side of the lamina which is exposed to the incoming light.

Glasses resulting from the previously mentioned examples may be readily hardened or tempered by the various hardening or tempering processes known in the art and the resulting tempered glasses have an advantage over the prior art because of their inherent resistance to strain and high temperatures without loss of their hardened characteristics.

From the foregoing description, it will be seen that glass compositions having desirable absorptive properties and working characteristics may be obtained and that novel means and methods are provided for attaining the results as set forth in the objects.

Summarily, the invention provides a base batch glass which has desirable working and melting characteristics, which can be fabricated by standard equipment and processes, and which may be reheated and reworked;

A fundamental base batch which may have optical absorbing ingredients added thereto and which ultimate glass may be reheated and re-fabricated without changing the fundamental characteristics of the glass, which glass may be ground and polished without affecting the ultimate surface qualities;

A base batch composition of the above characteristics to which infra-red absorbing ingredients may be added without materially altering the base batch characteristics;

A base batch composition to which ultra-violet absorbing ingredients may be added without changing the desirable characteristics of said batch;

A base batch composition to which both ultra-violet and infra-red absorbing ingredients may be added without altering the base batch characteristics;

An infra-red absorbing glass which may be used as protection lenses for the eyes or which may be used as a heat screen in a projection apparatus;

An infra-red absorbing heat screen normally having a slight tint at room temperature and which when subjected to the heat normally prevalent in the projection machine will bleach out and be substantially colorless with the result that desirable heat absorption is obtained with substantially no altering of the color of the light transmitted therethrough;

A base batch glass suitable for the above uses which has a high heat shock resistance;

Glasses resulting from the base batches embodying the invention, which glasses have high strain and softening temperatures so that they will not acquire strain in use nor lose any tempering strains which may be intentionally introduced by subsequent hardening treatment and which will not soften and flow under ordinary conditions of use;

A glass having desirable characteristics for producing laminated assemblies embodying an intermediate film of light polarizing material;

A glass composition having the above infra-red and ultra-violet absorbing characteristics in which desirable color qualities may be produced;

The provision of novel means and methods of obtaining the above results.

While certain metallic oxides have been referred to as monovalent or bivalent and which embraces such metallic oxides as $Li_2O$, $Na_2O$, $K_2O$, $BaO$, $CaO$, $ZnO$, $MgO$, and certain other oxides, it has been found that approximately 5 parts by weight produces satisfactory results when added to the formula set forth in Example 3. However, it is pointed out that for obtaining other desirable results, it has been found that the range of the various metallic oxides mentioned herein may vary from 0.1 to 15 parts by weight depending upon the particular results desired.

Having described my invention, I claim:

1. A glass composition whose chemical analysis may be expressed as follows:

|  | Parts by weight |
|---|---|
| $P_2O_5$ | 45 to 80 |
| $Al_2O_3$ | 8 to 25 |
| $SiO_2$ | 1 to 30 |

2. A glass composition whose chemical analysis may be expressed as follows:

|  | Parts by weight |
|---|---|
| $P_2O_5$ | About 68 |
| $Al_2O_3$ | About 16 |
| $SiO_2$ | About 16 |

3. A glass composition whose chemical analysis may be expressed as follows:

| | Parts by weight |
|---|---|
| $P_2O_5$ | About 63 |
| $Al_2O_3$ | About 15 |
| $SiO_2$ | About 20 | and containing as an added constituent

| | |
|---|---|
| FeO | About 2 |

4. A glass composition whose chemical analysis may be expressed as follows:

| | Parts by weight |
|---|---|
| $P_2O_5$ | 45 to 80 |
| $Al_2O_3$ | 8 to 25 |
| $SiO_2$ | 5 to 30 | and containing as an added constituent

| | |
|---|---|
| FeO | 0.5 to 6 |

5. A glass composition whose chemical analysis may be expressed as follows:

| | Parts by weight |
|---|---|
| $P_2O_5$ | About 63 |
| $Al_2O_3$ | About 15 |
| $SiO_2$ | About 20 | and containing as an added constituent

| | |
|---|---|
| FeO plus $Fe_2O_3$ | About 2 |

6. A glass composition whose chemical analysis may be expressed as follows:

| | Parts by weight |
|---|---|
| $P_2O_5$ | 45 to 80 |
| $Al_2O_3$ | 8 to 25 |
| $SiO_2$ | 5 to 30 | and containing as an added constituent

| | |
|---|---|
| FeO plus $Fe_2O_3$ | 0.5 to 10 |

7. A glass composition whose chemical analysis may be expressed as follows:

| | Parts by weight |
|---|---|
| $P_2O_5$ | About 63 |
| $Al_2O_3$ | About 15 |
| $SiO_2$ | About 18 | and containing as added constituents

| | |
|---|---|
| FeO plus $Fe_2O_3$ | About 2 |
| $Na_2O$ | About 2 |

8. A glass composition whose chemical analysis may be expressed as follows:

| | Parts by weight |
|---|---|
| $P_2O_5$ | 45 to 80 |
| $Al_2O_3$ | 8 to 25 |
| $SiO_2$ | 1 to 25 | and containing as added constituents

| | |
|---|---|
| FeO plus $Fe_2O_3$ | 0.5 to 10 |
| $Na_2O$ | 0.1 to 10 |

9. The process of forming a glass composition and controlling color, total energy transmission, ultra-violet transmission and visual tranmission of said composition consisting of forming a base batch of:

| Ingredient yielding: | Parts by weight |
|---|---|
| $P_2O_5$ | 45 to 80 |
| $Al_2O_3$ | 8 to 25 | and

| | |
|---|---|
| $SiO_2$ | 5 to 30 | and adding to said batch

| | |
|---|---|
| $Na_2O$ | 0.1 to 10 |
| FeO plus $Fe_2O_3$ | 0.5 to 10 | and heating said resultant composition to a controlled temperature according to the particular color, total energy transmission, ultra-violet transmission, and visual transmission desired.

10. A glass composition whose chemical analysis may be expressed as follows:

| | Parts by weight |
|---|---|
| $P_2O_5$ | 63 |
| $Al_2O_3$ | 15 |
| $SiO_2$ | 18 | and containing as an added constituent

| | |
|---|---|
| FeO plus $Fe_2O_3$ | 2 | and a metallic oxide selected from a group consisting of the alkali oxides $Li_2O$, $Na_2O$, $K_2O$, and the bivalent oxides BaO, CaO, ZnO, MgO, in the amount of about 5 parts by weight.

11. A glass composition whose chemical analysis may be expressed as follows:

| | Parts by weight |
|---|---|
| $P_2O_5$ | 45 to 80 |
| $Al_2O_3$ | 8 to 25 |
| $SiO_2$ | 1 to 25 | and containing as an added constituent

| | |
|---|---|
| FeO plus $Fe_2O_3$ | 0.5 to 10 | and a metallic oxide selected from a group consisting of $Li_2O$, $Na_2O$, $K_2O$, BaO, CaO, ZnO, BeO, MgO, in the amount of 0.1 to 15 parts by weight.

12. A glass composition as set forth in claim 1 having a strain temperature of approximately 750° C. and a softening temperature of approximately 880° C. which can be melted at about 1400° C. acquiring highly transparent homogeneous characteristics.

13. An optical glass as set forth in claim 1 characterized by an extraordinarily low optical dispersion.

14. The process of making a glass composition as set forth in claim 1 wherein the $P_2O_5$ and $Al_2O_3$ ingredients are derived essentially from aluminum metaphosphate and combined with $SiO_2$ to form a dry batch, heating said batch to its melting temperature, said resultant melt being capable of being worked and annealed with conventional glass making equipment.

15. A glass composition as set forth in claim 11 having infra-red absorbing characteristics and possessing, at ordinary room temperature, a slight tint with given visual transmission and at temperatures of a few hundred degrees or higher having increased visual transmission with said tint substantially bleached out.

16. A glass composition as set forth in claim 1 in which the $Al_2O_3$ is molecularly replaced by BeO.

17. A glass composition as set forth in claim 4 in which the $Al_2O_3$ is molecularly replaced by BeO.

ALEXIS G. PINCUS.